United States Patent [19]

Dierlam

[11] Patent Number: 5,597,108
[45] Date of Patent: Jan. 28, 1997

[54] PLUG STYLE PIPE LINE-UP CLAMP WITH COPPER BACK-UP SHOES

[75] Inventor: Oliver T. Dierlam, Houston, Tex.

[73] Assignee: CRC-Evans Pipeline International, Inc., Houston, Tex.

[21] Appl. No.: 434,303

[22] Filed: Apr. 28, 1995

[51] Int. Cl.6 .................... B23K 37/06; B23K 101/10
[52] U.S. Cl. ............................................. 228/49.3; 228/50
[58] Field of Search ................................. 228/49.3, 50

[56] References Cited

U.S. PATENT DOCUMENTS

| 163,217 | 5/1875 | Lawson | 279/2.17 |
|---|---|---|---|
| 1,770,649 | 7/1930 | Kirkman | 228/50 |
| 2,853,773 | 9/1958 | Darasko | 29/287 |
| 2,971,556 | 2/1961 | Armstrong et al. | 153/32 |
| 3,180,130 | 4/1965 | Avera | 72/465 |
| 3,197,195 | 7/1965 | Work et al. | 269/34 |
| 3,279,237 | 10/1966 | Rader | 72/466 |
| 3,387,761 | 6/1968 | Pickard | 228/42 |
| 3,400,872 | 9/1968 | Rogers | 228/44 |
| 3,422,519 | 1/1969 | Fehlman | 29/200 |
| 3,425,614 | 2/1969 | Clark | 228/49 |
| 3,458,105 | 7/1969 | Valentine | 228/44 |
| 3,458,106 | 7/1969 | Valentine | 228/44 |
| 3,469,299 | 9/1969 | Rogers | 29/200 |
| 3,512,229 | 5/1970 | Phariss | 24/280 |
| 3,570,109 | 3/1971 | Harlan et al. | 29/491 |
| 3,571,908 | 3/1971 | Pilia | 29/493 |
| 3,580,044 | 5/1971 | De Voss et al. | 72/466 |
| 3,633,813 | 12/1972 | Looney et al. | 228/44 |
| 3,668,359 | 6/1972 | Emmerson | 219/60 A |
| 3,699,635 | 10/1972 | Bradley et al. | 29/252 |
| 3,741,457 | 6/1973 | Gwin et al. | 228/44 |
| 3,750,928 | 8/1973 | Valentine | 228/44 |
| 3,765,665 | 10/1973 | Work | 269/27 |
| 3,920,232 | 11/1975 | Clark | 269/25 |
| 3,937,382 | 2/1976 | Cunningham et al. | 228/49 |
| 3,979,041 | 9/1976 | Kaneyama et al. | 228/49 |
| 4,006,619 | 2/1977 | Anderson | 72/54 |
| 4,101,067 | 7/1978 | Sloan et al. | 228/222 |
| 4,140,262 | 2/1979 | Wilson et al. | 228/49 |
| 4,159,072 | 6/1979 | Lajoie et al. | 228/49 |
| 4,216,896 | 8/1980 | Chang et al. | 228/212 |
| 4,285,458 | 8/1981 | Slavens | 228/49 |
| 4,306,134 | 12/1981 | Slavens et al. | 219/60 |
| 4,413,655 | 11/1983 | Brown | 138/97 |
| 4,418,860 | 12/1983 | LaForce | 228/196 |
| 4,493,203 | 1/1985 | Wheeler et al. | 72/369 |
| 4,525,616 | 6/1985 | Slavens | 219/60 |
| 4,556,162 | 12/1985 | Gwin et al. | 228/50 |
| 4,867,368 | 9/1989 | Tesch | 228/49.3 |
| 5,090,608 | 2/1992 | Jones | 228/49.3 |
| 5,110,031 | 5/1992 | Rinaldi | 228/50 |
| 5,356,067 | 10/1994 | Leduc | 228/44.5 |

FOREIGN PATENT DOCUMENTS

| 1123062 | 2/1962 | Germany. |
|---|---|---|
| 56-111591 | 9/1981 | Japan. |
| 585898 | 12/1977 | U.S.S.R.. |
| 889361 | 12/1981 | U.S.S.R.. |
| 2205143 | 11/1988 | United Kingdom. |

OTHER PUBLICATIONS

Welding Journal, vol. 66, No. 2, Feb. 1987, p. 14.

Primary Examiner—Kenneth J. Ramsey
Attorney, Agent, or Firm—Richards, Medlock & Andrews

[57] ABSTRACT

A line-up clamp (10) is disclosed for clamping small diameter pipe sections together for welding. The line-up clamp includes back-up shoe assemblies (106) which are pivoted into engagement with the interior surfaces of the pipe sections adjacent the weld as the clamp clamps the pipe sections. As the hydraulic cylinder (14) compresses the resilient disks, expanding the disks into clamping contact with the pipe sections, actuator bodies (58, 88) are urged together, with tapered surfaces on facing back-up shoe assemblies moving into contact and driving the back-up shoe assemblies into contact with the interior surfaces of the pipe sections at the point of welding.

13 Claims, 7 Drawing Sheets

PLUG STYLE PIPE LINE-UP CLAMP WITH COPPER BACK-UP SHOES

TECHNICAL FIELD OF THE INVENTION

This invention relates to aligning pipe sections for welding, and particularly to welding using copper back-up shoes.

BACKGROUND OF THE INVENTION

In assembling a pipeline, it is common to align the abutting ends of two pipe sections together with a line-up clamp positioned within the pipe sections at the joint to be welded. Once aligned, a more effective weld can be performed by use of back-up shoes, particularly made of copper, at the joint to be welded which engage the inside surface of both pipe sections at the joint. Devices such as shown in U.S. Pat. No. 5,356,067 to Leduc, U.S. Pat. No. 5,110,031 to Rinaldi, U.S. Pat. No. 4,556,162 to Gwin, et. al., and U.S. Pat. No. 3,937,382 to Cunningham, et. al., disclose devices with back-up shoes and discuss the advantages thereof.

Smaller diameter pipe cannot accept the typical line-up pipe clamp as discussed in the patents noted above. For smaller pipe, a technique has been developed, as disclosed in U.S. Pat. No. 5,090,608 to Jones, for providing a line-up clamp using expandable disks, made of polyurethane, to clamp against the inside surfaces of the pipe sections to be welded. In smaller pipe, no effective back-up shoe mechanism has yet been developed.

SUMMARY OF THE INVENTION

A line-up clamp is provided for clamping first and second pipe sections in alignment for welding. The line-up clamp includes a guide assembly with a fluid cylinder mounted to the guide assembly and having an elongate rod movable between a first position and a second position relative the fluid cylinder. The elongate rod has a distal end. A first plurality of expandable disks are concentric with a first portion of the elongate rod while a second plurality of expandable disks are concentric with a second portion of the elongate rod. A center member is concentric with the elongate rod between the first and second plurality of expandable disks. An end member is rigidly mounted on the elongate rod at the distal end thereof. The elongate rod in the first position expands the first and second plurality of disks between the end member, center member and guide assembly to clamp the first and second pipe sections in alignment for welding. At least one back-up shoe is mounted at the center member. The back-up shoe moves against the inside surfaces of the aligned pipe sections when the elongate rod is in the first position and moves to a release position spaced from the interior surfaces when the elongate rod is in the second position.

In accordance with another aspect of the present invention, a first tube is slidable along the first portion of the elongate rod and concentric therewith. A first actuator body is operationally coupled to the first tube at an end of the first tube proximate the center member. The back-up shoe is pivotally mounted to the actuator body.

In accordance with another aspect of the present invention, the first tube is operably coupled to the first actuator body by a coil spring.

In accordance with another aspect of the present invention, a second tube is slidable along the second portion of the elongate rod and concentric therewith and a second actuator body is operationally coupled to the second tube at an end of the second tube proximate the center member. A second back-up shoe is pivotally mounted to the second actuator body. Movement of the elongate rod to the first position causes the first and second actuator bodies to move along the elongate rod with the first and second back-up shoes contacting and pivoting against the interior surfaces of the aligned first and second pipe sections.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION

Figure 1:
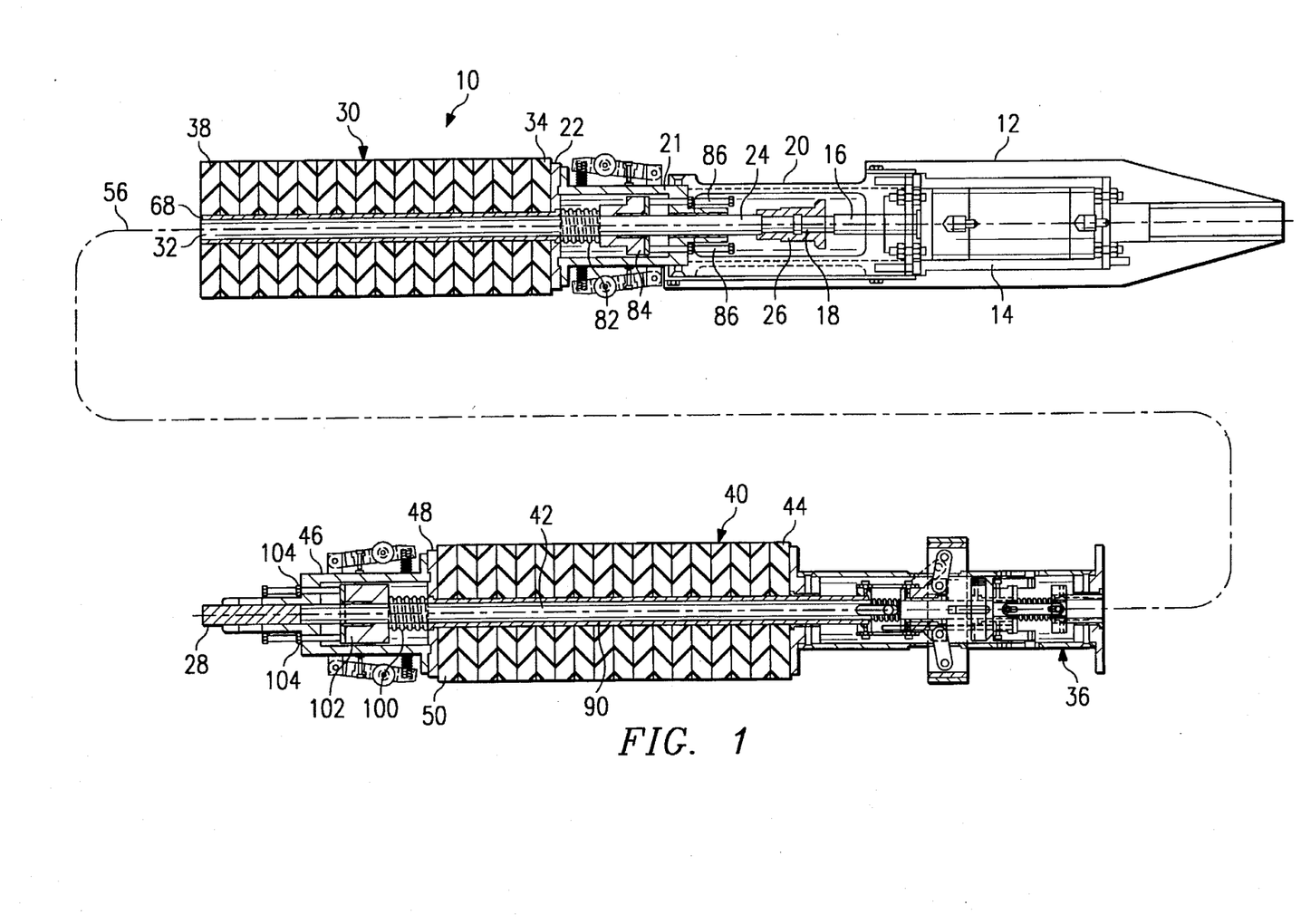
FIG. 1 is a side view in partial cross section of a plug style line-up clamp forming a first embodiment of the present invention.

With reference now to the accompanying drawings, a plug style line-up clamp 10 constructed in accordance with the teachings of the present invention is illustrated. As seen in FIG. 1, the line-up clamp 10 includes a guide assembly 12 mounting a hydraulic cylinder 14. The piston 16 of the hydraulic cylinder extends to a threaded end 18. The hydraulic cylinder 14 is connected to a source of hydraulic pressure, not shown, to move the piston 16 between a retracted position and an extended position.

An end frame 20 is mounted to the guide assembly 12 and includes an end member 21. A center shaft 24 is threadedly coupled to the threaded end of piston 16 by a connector nut 26 and extends to a distal end 28 along axis 56. A plurality of first resilient disks 30 are positioned concentric with sliding tube 68, which, in turn, is concentric with a first portion 32 of the center shaft 24. The disk 34 at one end abuts an end piece 22 free floating on sliding tube 68. End plate 22 also abuts the end member 21.

A center member 36 is free floating on the center shaft 24 and abuts disk 38 of the first plurality of disks 30. A second plurality of resilient disks 40 are concentric with sliding tube 90, which, in turn, is concentric with a second portion 42 of the center shaft, with disk 44 abutting the center member 36. An end frame 46 is mounted at the distal end 28 of the center shaft 24. An end plate 48 is free floating on sliding tube 90 and is positioned between end frame 46 and disk 50.

As can be understood, hydraulic pressure entering hydraulic cylinder 14 to cause the piston 16 to retract into the cylinder will draw center shaft 24 toward the right, as seen in FIG. 1, to compress the first and second plurality of resilient disks 30 and 40 between end frames 20 and 46 and center member 36 to expand the disks 30 and 40 outward to clamp against the interior surface of adjacent first and second pipe sections 52 and 54. A mechanism of this type is disclosed in U.S. Pat. No. 5,090,608 issued on Feb. 25, 1992 which patent is incorporated herein by reference in its entirety.

Mounted within the center member 36 for limited movement along axis 56 is a first actuator body 58. Mounted on the body 58 are first and second positioning links 60 and 62, each ending in a roller 64. Rollers 64 are guided within grooves 66 formed in the center member that allow the actuator body 58 to move along the axis 56, but prevent the actuator body 58 from rotating about the axis 56.

First sliding tube 68 is mounted concentric with the center shaft 24 along the first portion 32 thereof. One end of the first sliding tube 68 ends in a head 70 within the center member 36. A coil spring 72 extends between the head 70 and the actuator body 58 concentric with center shaft 24. Slotted links 74 and 76 also extend between the head 70 and the actuator body 58 and engage shoulder screws 78 mounted on the actuator body 58 and head 70. The slotted links have elongated slots 80 engaging each of the shoulder screws 78 to permit limited motion of the first sliding tube 68 toward the actuator body 58 but limiting the separation between the actuator body 58 and first sliding tube 68.

The opposite end of the first sliding tube 68 extends into the end member 21. A body 84 is secured on the opposite end of tube 68 with the body 84 concentric with the center shaft 24. A coil spring 82 extends between end plate 22 and body 84. Body 84 is limited from moving too far to the right as seen in FIG. 1 within end member 21 by a series of adjustable bolts 86. Bolts 86 can be adjusted to limit rightward movement of the body 84 at a selected position along the axis 56 relative to the end frame 20 and end member 21.

Figure 6:
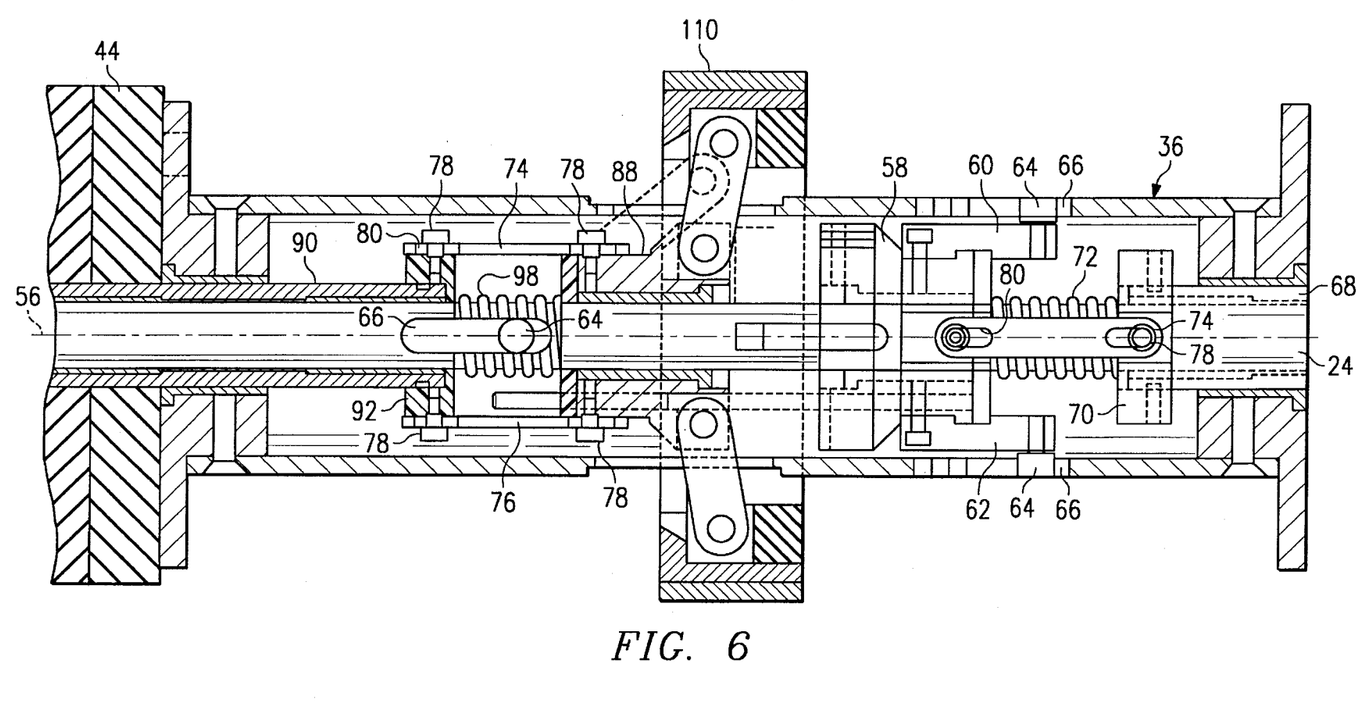
FIG. 6 is a cross-sectional view of the center member.

Second actuator body 88 is also slidable along center shaft 24 within the center member 36. Actuator body 88 is substantially identical to actuator body 58 and is positioned to face body 58 as seen in FIG. 6. A second sliding tube 90 is concentric with the center shaft 24 along the second portion 42 thereof. An end of the second sliding tube 90 extends within the center member and ends in a head 92 which is connected to the second actuator body 88 by slotted links 74 and 76 and shoulder screws 78. A coil spring 98 is positioned between the head 92 and the second actuator body 88. The opposite end of the second sliding tube 90 extends into end frame 46. A body 102 is secured to the opposite end of tube 90 within end frame 46. A coil spring 100 extends between the end plate 48 and body 102. End plate 48 is free floating on sliding tube 90 relative to end frame 46. Bolts 104 can be adjusted to limit the leftward motion of body 102 along axis 56 relative to end frame 46 as seen in FIG. 1.

With reference now to FIGS. 2–19, each of the actuator bodies can be seen to mount a pair of back-up shoe assemblies 106.

Figure 7:
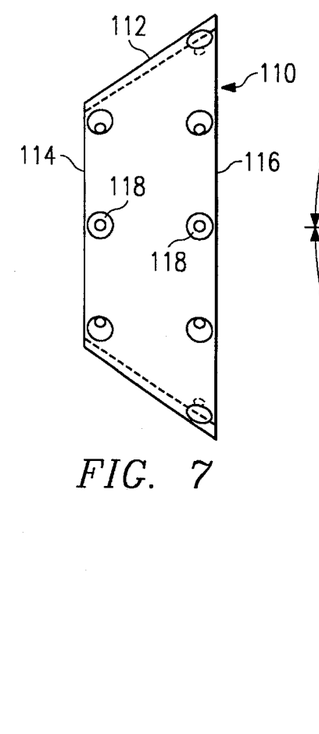
FIG. 7 is a top view of the back-up shoe.
Figure 8:
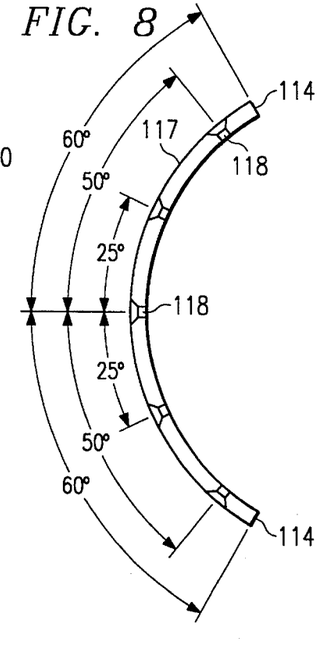
FIG. 8 is a side view of the back-up shoe.
Figure 9:
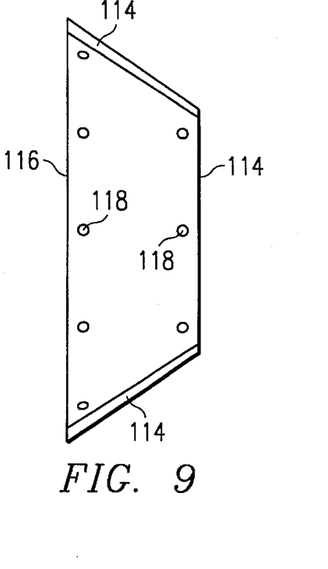
FIG. 9 is an inside view of the back-up shoe.

Each back-up shoe assembly includes a back-up shoe 110, preferably formed of copper, as illustrated in FIGS. 7–9. The back-up shoe 110 can be seen to be curved to form part of an arc of a circle, with tapered ends 112 so that a first side 114 of the shoe extends only about 60 degrees of arc while the second side 116 extends about 120 degrees of arc. The outer surface 117 of the shoe 110 is curved to match the radius of the inner surface of the pipe sections to be welded, for example 3 and 11/16 inches. A series of countersunk holes 118 are formed through the shoe.

Figure 13:
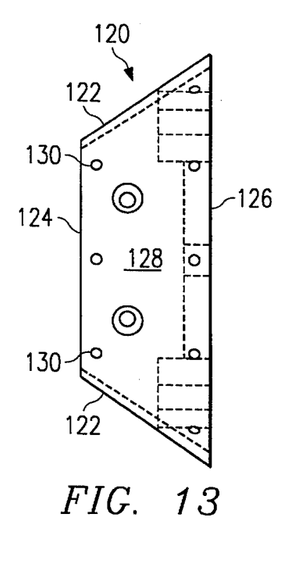
FIG. 13 is a top view of the back-up shoe mount.
Figure 14:
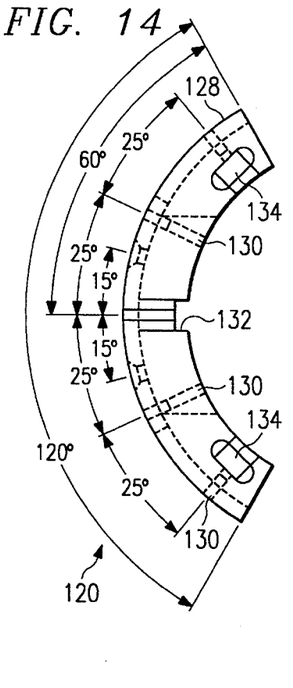
FIG. 14 is a side view of the back-up shoe mount.
Figure 15:
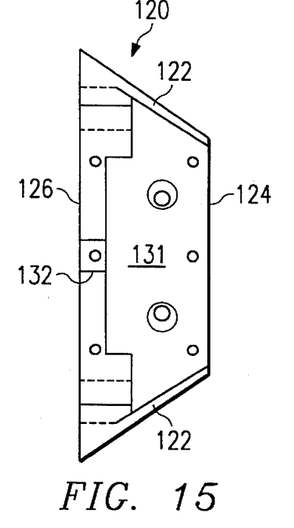
FIG. 15 is an inside view of the back-up shoe mount.

Back-up shoe 110 is bolted to a back-up shoe mount 120, as illustrated in FIGS. 13–15. The mount 120 is of similar configuration to the shoe 110, including tapered ends 122, a first side 124 that extends an arc of about 60 degrees and a second side 126 which extends an arc of about 120 degrees. The outer surface 128 of the mount 120 has a series of threaded apertures 130 to receive bolts to bolt the shoe 110 thereon.

At the inner surface 131, a notch 132 is formed in the middle thereof and elongate slots 134 are formed therein.

Figure 4:
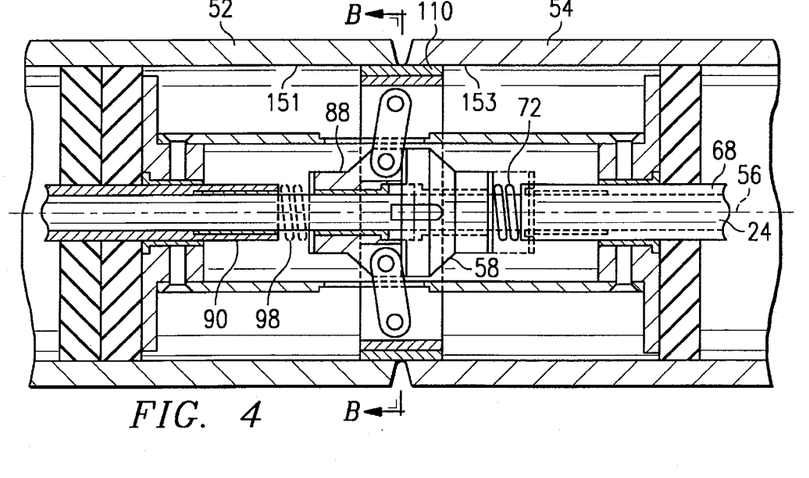
FIG. 4 is an illustrative side view of the center member of the line-up clamp with the clamping shoes expanded.
Figure 5:
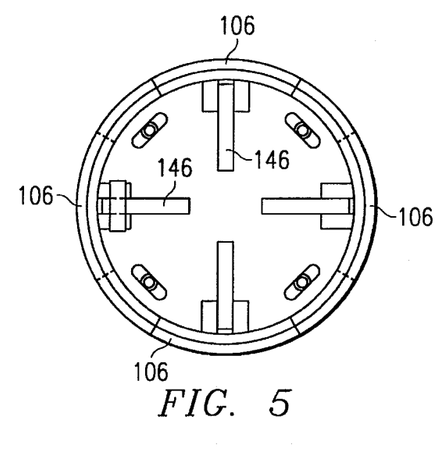
FIG. 5 is a cross-sectional view taken along line B—B in FIG. 4.
Figure 10:
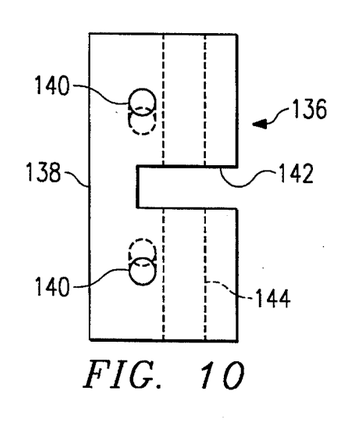
FIG. 10 is a top view of the back-up shoe journal.
Figure 11:
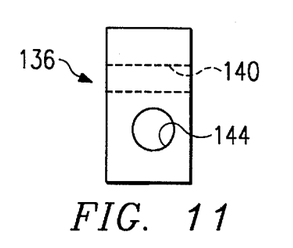
FIG. 11 is an end view of the back-up shoe journal.
Figure 12:
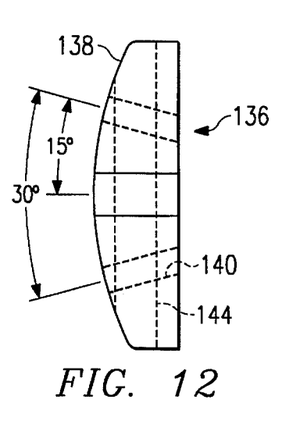
FIG. 12 is a side view of the back-up shoe journal.
Figures 16, 17:
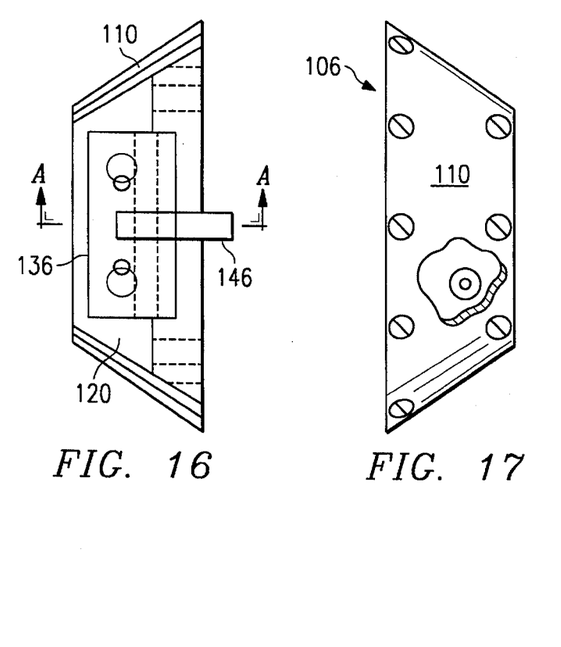
FIG. 16 is an inside view of the back-up shoe assembly.
FIG. 17 is a top view of the back-up shoe assembly.
Figure 18:
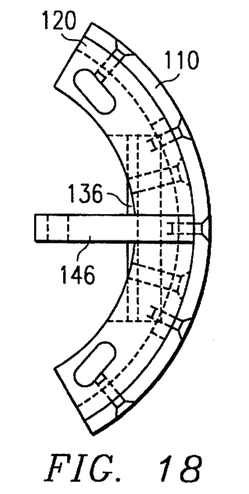
FIG. 18 is a side view of the back-up shoe assembly.
Figures 19, 20:
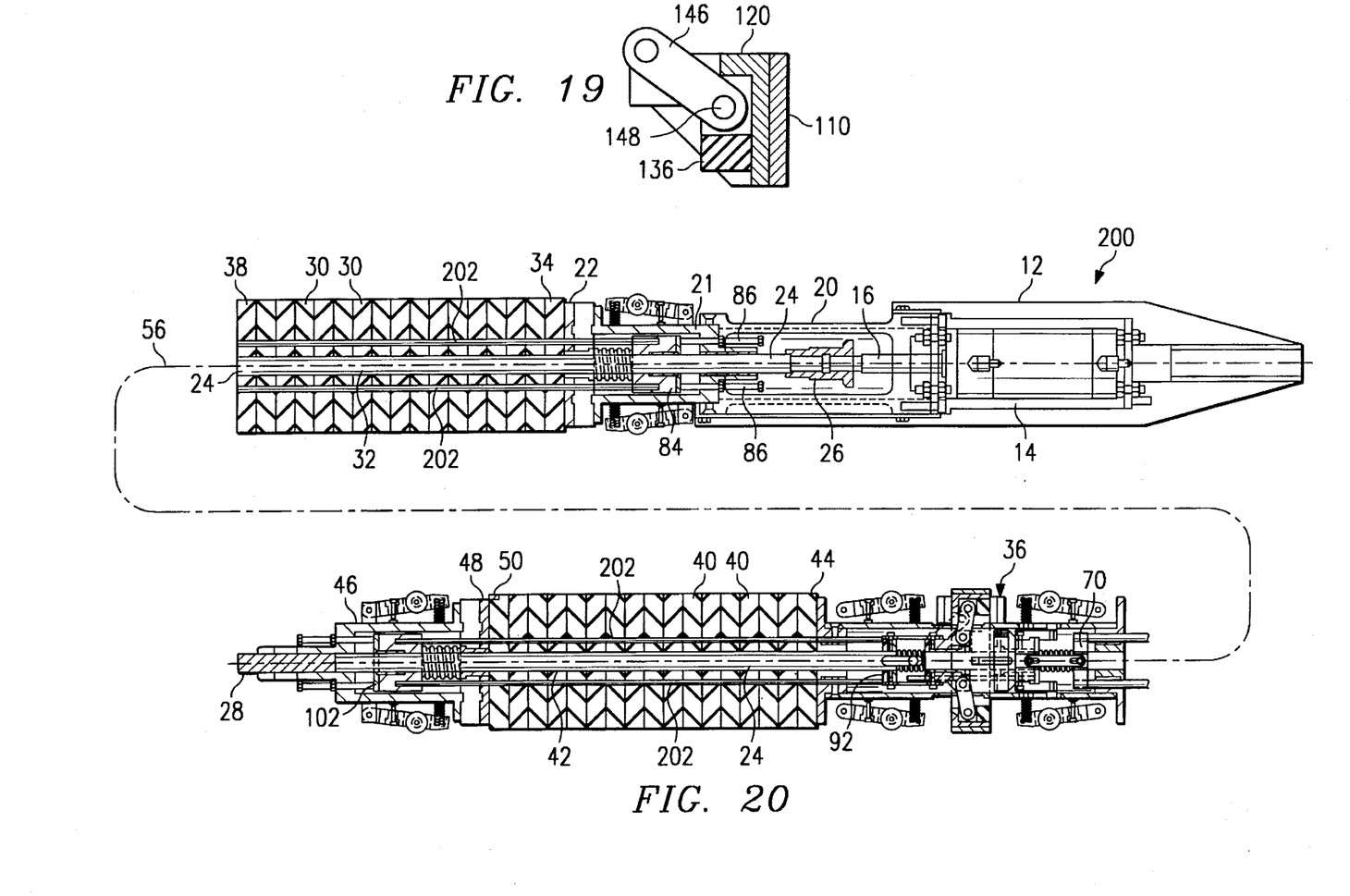
FIG. 19 is a cross-sectional view of the back-up shoe assembly taken along A—A in FIG. 16.
FIG. 20 is a side view of a plug style line-up clamp forming a second embodiment of the present invention.

The mount 120 is, in turn, secured to a back-up shoe journal 136 illustrated in FIGS. 10–12. The journal 136 has a curved portion 138 to fit within the mount 120 and bolt holes 140 to receive bolts to secure the mount 120 on the journal 136. A slot 142 is formed in the journal and a pivot pin aperture 144 extends through the journal opening into the slot 142. A link 146, seen in FIGS. 16, 18 and 19, is pivotally secured by a pivot pin 148 fit within the aperture 144. The end of link 146 opposite pin 148 is similarly pinned to the actuator body by a pivot pin 150 as seen in FIGS. 2 and 4.

Figure 2:
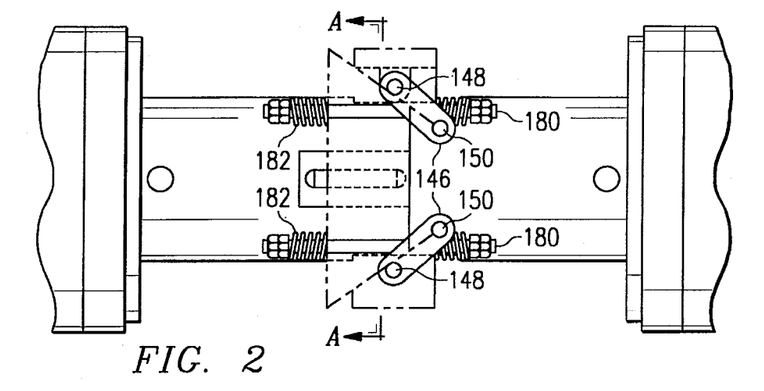
FIG. 2 is an illustrative side view of the center member of the line-up clamp with the back-up shoes retracted.
Figure 3:
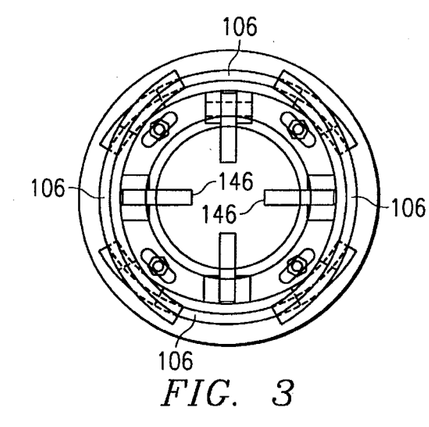
FIG. 3 is a cross-sectional view taken along line A—A in FIG. 2.

As best seen in FIGS. 1–5, the back-up shoe assemblies are linked to the actuator bodies 58 and 88 by links 146 with the first sides of smaller arc facing each other. The shoe assemblies on the actuator body 58 are positioned to mesh within the gaps between the back-up shoe assemblies on the actuator body 88, as seen in FIG. 2.

As the hydraulic cylinder is actuated to compress the resilient disks along axis 56 and thereby expand the resilient disks into contact with the interior surface of the pipe sections being clamped, the end member 21 contacts first sliding tube 68 through bolts 86 and body 84, end frame 46 contacts second sliding tube 90 through bolts 104 and body 102 and coil springs 72, 82, 98 and 100 are compressed to urge the actuator bodies 58 and 88 toward each other. As they move toward each other, the tapered ends of each of the components of the back-up shoe assemblies engage each other and pivot the back-up shoe assemblies radially outward from axis 56 and into engagement with the interior surfaces 151 and 153 of the pipe sections 52 and 54 at the abutting ends of the pipeline to back up the weld to be performed. This motion is guided by guide rods 180 and springs 182 passing through aligned slots 134 in facing shoe assemblies.

The amount of travel and force exerted by the back-up shoes on the interior surfaces of the pipe sections is controlled by the initial positioning of the bodies 84 and 102 which, in turn, are controlled by adjustment of the adjustable bolts 86 and 104. This permits screw adjustments to be made to correct for any variation in disk compression so that the back-up shoes are not overstressed against the interior surface of the pipe sections.

After welding has been completed, the hydraulic pressure in cylinder 14 is relieved, permitting the disks 30 and 40 to relax to their natural state. As this occurs, the coil springs 72, 82, 98 and 100 expand as well. The springs 82 and 100 and links 74 and 76 provide a positive mechanical action to pull the actuator bodies 58 and 88 apart and pivot the back-up shoe assemblies away from the interior surfaces of the pipeline once the sliding tubes 68 and 90 move a sufficient distance away from the respective actuator bodies to take up the slack in the elongated slots 80 for the shoulder screws 78 to engage the ends of the slots.

Figure 21:
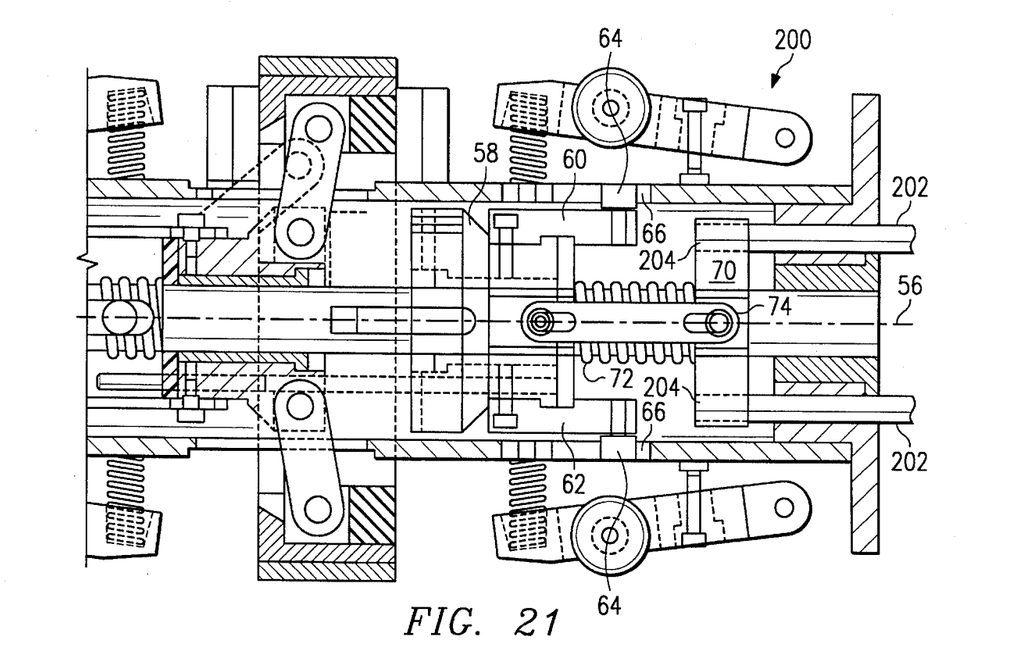
FIG. 21 is an illustrative side view of the clamp of FIG. 20.
Figure 22:
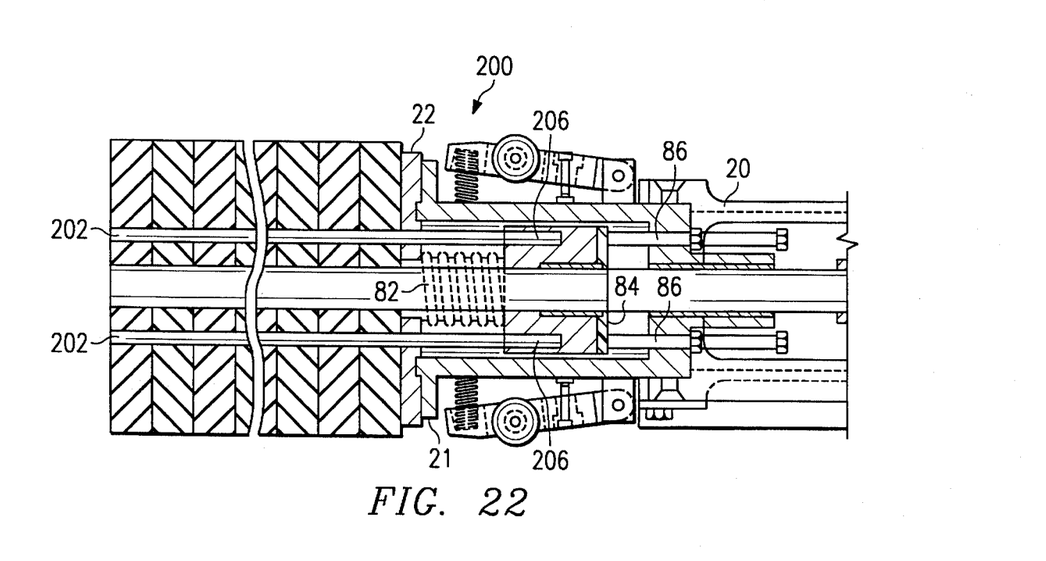
FIG. 22 is an illustrative side view of the clamp of FIG. 20.

With reference now to FIGS. 20–22, a second embodiment of the invention, line up clamp 200, is illustrated. Many of the components of line up clamp 200 are identical to those in line up clamp 10, and are identified by the same reference numerals. However, push rods 202, four each per clamp half, replace tubes 68 and 90 in line up clamp 200. These push rods 202 would pass through holes in the disks 30 and 40 on the clamp halves at approximately the same bolt circle as the adjustable bolts 86 and 104. Tubes 68 and 90 would be relatively expensive and complicated to produce as compared to rods 202, and therefore use of the rods 202 can reduce the cost and complexity of the clamp. The heads 70 and 92 can be mounted in threaded inner ends 204 of the rods 202, as seen in FIG. 22. The bodies 84 and 102 are secured to the outer ends 206 of the rods 202 as seen in FIG. 21.

It can be seen that the line-up clamp 10 of the present invention provides not only a mechanism for clamping pipe sections in alignment for welding, but as well provides for back-up shoes to engage the interior surfaces of the pipe sections at the weld location to enhance the weld. The clamp provides for a positive withdrawal of the back-up shoes away from the interior surfaces of the pipe sections. This positive force permits the back-up shoes to be withdrawn from the pipe sections even if some welding of the back-up shoes to the pipe sections has occurred.

Although a single embodiment of the invention has been illustrated in the accompanying drawings, and described in the foregoing Detailed Description, it will be understood that the invention is not limited to the embodiment disclosed, but is capable of numerous rearrangements, modifications and substitutions of parts and elements without departing from the scope and spirit of the invention.

I claim:

1. A line-up clamp for clamping first and second pipe sections in alignment for welding, comprising:

a guide assembly;

a fluid cylinder mounted on the guide assembly and having an elongate rod movable between a first position and a second position relative the fluid cylinder, the elongate rod having a distal end;

a first plurality of expandable disks concentric with a first portion of the elongate rod;

a second plurality of expandable disks concentric with a second portion of the elongate rod;

a center member concentric with the elongate rod positioned between the first and second plurality of expandable disks;

an end member rigidly mounted on the elongate rod at the distal end thereof;

the elongate rod in the first position expanding the first and second plurality of disks between the end member, center member and guide assembly to clamp the first and second pipe sections in alignment for welding; and at least one back-up shoe assembly positioned at the center member urged against the interior surfaces of the aligned pipe sections when the elongate rod is in the first position and released from the interior surfaces of the aligned pipe sections when the elongate rod is in the second position.

2. The line-up clamp of claim 1 further comprising an actuator body slidable along the elongate rod at the center member, the back-up shoe assembly pivotally mounted to the actuator body, movement of the elongate rod to the first position pivoting the back-up shoe assembly into contact with the interior surfaces of the pipe sections.

3. The line-up clamp of claim 2 further comprising a slidable tube, the tube slidable along the first portion of the elongate rod and operationally coupled to the guide assembly and actuator body, the slidable tube moving the actuator body along the elongate rod as the elongate rod moves to the first position.

4. The line-up clamp of claim 2 further comprising a second back-up shoe assembly and a second actuator body, the second actuator body slidable along the elongate rod, each of the back-up shoe assemblies having a first side and a second side and tapered ends interconnecting the first and second sides, the first sides extending a lesser arcuate distance than the second sides, the first sides of the first and second back-up shoe assemblies facing each other, movement of the elongate rod to the first position forcing the actuator bodies together, forcing the tapered ends of the first and second back-up shoe assemblies to engage and push the back-up shoe assemblies radially outward into engagement with the interior surfaces of the aligned pipe sections.

5. The line-up clamp of claim 1 wherein the back-up shoe assembly has a first side and a second side, tapered ends interconnecting the first and second sides.

6. The line-up clamp of claim 1 wherein the back-up shoe assembly includes a copper back-up shoe, a back-up shoe mount and a back-up shoe journal.

7. A backup shoe device for welding first and second pipe sections at abutting ends thereof, comprising:

a first actuator body;

a second actuator body;

a first backup shoe assembly pivoted to the first actuator body, the first backup shoe assembly having a first side, a second side and tapered ends;

a second backup shoe assembly pivoted to the second actuator body, the second backup shoe assembly having a first side, a second side and tapered ends;

a guide for guiding the actuator bodies along an axis concentric with the elongate axis of the first and second pipe sections aligned for welding;

a mechanism for moving the actuator bodies toward each other along the guide, the first sides of the backup shoe assemblies facing each other, the tapered ends of the first and second shoe assemblies engaged to pivot the first and second backup shoe assemblies into engagement with the interior surfaces of the aligned first and second pipe sections.

8. The device of claim 7 wherein two backup shoe assemblies are linked to the first actuator body and two backup shoe assemblies are linked to the second actuator body.

9. The device of claim 8 wherein the first side of each of the backup shoe assemblies extends for an arc of about 60° and the second side of each of the backup shoe assemblies extends for an arc of about 120°.

10. The device of claim 7 further comprising a first and second plurality of elastomeric disks concentric with the guide and a mechanism for urging the first and second plurality of disks together to clamp the first and second pipe sections in alignment for welding.

11. The device of claim 7 wherein the mechanism to move the actuator bodies together includes a first coil spring engaging the first actuator body and a second coil spring engaging the second actuator body to exert the force on each of the actuator bodies moving the bodies together.

12. The device of claim 11 further comprising a first sliding tube slidable along the guide and a second sliding tube slidable along the guide, the first coil spring positioned between an end of the first sliding tube and the first actuator body and the second coil spring positioned between an end of the second tube and the second actuator body.

13. The device of claim 12 further comprising a first head mounted on said end of the first sliding tube and a second head mounted on said end of the second sliding tube, at least one first link connected between the first head and the first actuator body permitting limited movement of the first actuator body relative to the first sliding tube, at least one second link interconnecting the second head with the second actuator body, permitting limited axial movement of the second actuator body relative to the second sliding tube.

* * * * *